(12) United States Patent  
Zhang et al.

(10) Patent No.: US 9,088,797 B2  
(45) Date of Patent: Jul. 21, 2015

(54) VIDEO PROCESSING METHOD AND APPARATUS WITH RESIDUE PREDICTION

(75) Inventors: Kai Zhang, Beijing (CN); Li Zhang, Beijing (CN); Siwei Ma, Beijing (CN); Wen Gao, Beijing (CN); Shaw-Min Lei, Sijhih (TW)

(73) Assignee: MEDIATEK SINGAPORE PTE. LTD., Solaris (SG)

( * ) Notice: Subject to any disclaimer, the term of this patent is extended or adjusted under 35 U.S.C. 154(b) by 930 days.

(21) Appl. No.: 13/119,757

(22) PCT Filed: Dec. 19, 2008

(86) PCT No.: PCT/CN2008/073599  
§ 371 (c)(1),  
(2), (4) Date: Mar. 18, 2011

(87) PCT Pub. No.: WO2010/069113  
PCT Pub. Date: Jun. 24, 2010

(65) Prior Publication Data  
US 2011/0170606 A1 Jul. 14, 2011

(51) Int. Cl.  
*H04N 7/26* (2006.01)  
*H04N 7/50* (2006.01)  
*H04N 19/51* (2014.01)

(52) U.S. Cl.  
CPC ..................... *H04N 19/51* (2014.11)

(58) Field of Classification Search  
USPC .................................................. 375/240.16  
See application file for complete search history.

(56) References Cited

U.S. PATENT DOCUMENTS

| 6,888,894 B2 * | 5/2005 | Prakash et al. ........... 375/240.25 |
| 2008/0107181 A1 * | 5/2008 | Han et al. ................. 375/240.16 |
| 2010/0310184 A1 * | 12/2010 | Yu et al. ....................... 382/238 |

* cited by examiner

*Primary Examiner* — Andy Rao  
*Assistant Examiner* — Tyler Edwards  
(74) *Attorney, Agent, or Firm* — McClure, Qualey & Rodack, LLP (57) ABSTRACT

A video processing apparatus with residue prediction includes a motion estimation/compensation unit to determine a matching block of a reference video frame, obtain a motion vector of a current block of a current video frame that is related to the matching block, and acquire neighboring reconstructed pixels adjacent to the current block and corresponding pixels adjacent to the matching block with the motion vector alignment. Additionally, a pseudo-residue generating unit is included and constructs pseudo residues according to the neighboring reconstructed pixels and the corresponding pixels, an arithmetic unit is included and generates first-order residues by subtracting the matching block from the current block, and a residue-predicting unit is included and derives second-order residues and corresponding information according to the pseudo residues and the first-order residues. Moreover, a post-processing unit is included and derives a reconstructed current block according to the second-order residues and its corresponding information.

27 Claims, 5 Drawing Sheets

VIDEO PROCESSING METHOD AND APPARATUS WITH RESIDUE PREDICTION

CROSS-REFERENCE TO RELATED APPLICATION

This application is a co-pending application which claims priority to PCT Application No. PCT/CN2008/073599, filed Dec. 19, 2008 entitled "Video Processing Method and Apparatus with Residue Prediction", herein incorporated by reference in its entirety.

BACKGROUND OF THE INVENTION

1. Field of the Invention

The invention relates to video processing and more particularly relates to a video processing method and apparatus with residue prediction.

2. Description of the Related Art

With rapid development of video processing, including decoding and encoding technology, higher compression ratios so that video can be stored and broadcasted more efficiently are being demanded. Generally, a video sequence is composed of a series of video frames containing spatial and temporal redundancies, which may be encoded by many block-based video-coding standards, e.g., MPEG-1/2/4, H.264, etc., without significantly sacrificing video quality.

As for the H.264 standard, spatial correlations between adjacent pixels or blocks may be removed by introducing intra-frame prediction methods. Thus, allowing a current block to be predicted from reconstructed neighboring pixels of previous blocks within a current video frame. Due to intra-frame prediction, each block is reconstructed for encoding subsequent neighboring blocks. Further, inter-frame prediction (i.e., motion compensation prediction) has been adopted to reduce temporal redundancies between successive video frames by using motion vectors which indicate the displacement of a moving object from a current block in the current video frame to a corresponding displaced block in a reference video frame. The difference between the current block and the corresponding displaced block is referred to as residues. The reconstructed video frame is used for intra-frame prediction of subsequent neighboring blocks within the current video frame and inter-frame prediction of subsequent video frames.

In most cases, intra-frame prediction is selected only when a scene change occurs or significant motion exists. However, intra-frame prediction possesses some merits in image regions with high geometric features and provides error resilience. In some research studies, motion compensation can be combined with the intra-frame prediction. C. Chen and K. Pang, "Hybrid Coders with Motion Compensation," *Multidimensional Systems and Signal Processing*, May. 1992 describes that some spatial correlations are among motion compensation residues. Also, B. Tao and M. Orchard, "Gradient-Based Residual Variance Modeling and Its Applications to Motion-Compensated Video Coding," *IEEE Transactions on Image Processing*, January 2001 mentions that the spatial correlations show some geometric features. Further, the method described by K. Andersson in "Combined Intra Inter Prediction Coding Mode," VCEG-AD11, 30*th VCEG meeting*, October 2006 proposes a direct combination of intra-frame prediction and inter-frame prediction. Another method disclosed by S. Chen, L. Yu in "Re-prediction in Inter-prediction of H.264," *VCEG-AG*20, 33*rd VCEG meeting*, October 2007 uses the residues of neighboring blocks in a current video frame to predict the motion compensation residues of a current block within the current video frame. Nevertheless, no apparent improvement in coding efficiency is specified according to the prior art.

Therefore, it is crucial to provide an innovative algorithmic technique for video coding capable of utilizing residual correlations between neighboring blocks to predict the current block to improve coding efficiency or enhancing video quality.

BRIEF SUMMARY OF THE INVENTION

A video processing apparatus with residue prediction of a current video frame spatially partitioned into a plurality of blocks is disclosed. The video processing apparatus comprises a motion estimation/compensation unit, a pseudo-residue generating unit, a first arithmetic unit, a residue-predicting unit and a post-processing unit. The motion estimation/compensation unit determines a matching block of a reference video frame according to a current block of the current video frame, obtains a motion vector of the current block describing motion relative to the matching block, acquires neighboring reconstructed pixels adjacent to the current block, and retrieves corresponding pixels adjacent to the matching block by aligning the neighboring reconstructed pixels with the motion vector. The pseudo-residue generating unit constructs a set of pseudo residues according to the neighboring reconstructed pixels in the current video frame and the corresponding pixels in the reference video frame. The first arithmetic unit generates first-order residues by subtracting the matching block from the current block. The residue-predicting unit is coupled to the pseudo-residue generating unit for employing the set of pseudo residues to predict the first-order residues and derive second-order residues and corresponding residue prediction information for the current block. The post-processing unit is coupled to the residue-predicting unit for deriving a reconstructed current block according to the second-order residues and the corresponding residue prediction information for encoding subsequent blocks within the current video frame.

According to another embodiment of the invention, a video processing method with residue prediction of a current video frame spatially partitioned into a plurality of blocks is provided, comprising: determining a matching block of a reference video frame according to a current block of the current video frame; obtaining a motion vector of the current block describing motion relative to the matching block; acquiring neighboring reconstructed pixels adjacent to the current block; retrieving corresponding pixels adjacent to the matching block by aligning the neighboring reconstructed pixels with the motion vector; constructing a set of pseudo residues according to the neighboring reconstructed pixels in the current video frame and the corresponding pixels in the reference video frame; generating first-order residues by subtracting the matching block from the current block; employing the set of pseudo residues to predict the first-order residues; deriving second-order residues and corresponding residue prediction information for the current block; and deriving a reconstructed current block according to the second-order residues and the corresponding residue prediction information for encoding subsequent blocks within the current video frame.

According to still another embodiment of the invention, a video decoder with residue prediction for decoding a bitstream into video frames partitioned into a plurality of blocks is provided. The video decoder comprises a decoding unit, an inverse quantization and discrete cosine transform (IQ/IDCT) unit, a pseudo-residue generating unit, a residue predicting unit, an arithmetic unit, a motion compensation unit, and a reconstruction unit. The decoding unit receives and decodes the bit-stream for generating inter mode information, residue prediction information and corresponding residual data. The inverse quantization and discrete cosine transform (IQ/IDCT) unit generates a reconstructed second-order residues from the residual data for reconstructing a current block of a current video frame from the residual data. The pseudo-residue generating unit provides pseudo residues for reconstructing the current block. The residue predicting unit derives a prediction set of the current block according to the residue prediction information from the decoding unit and the pseudo residues from the pseudo-residue generating unit. The arithmetic unit outputs first-order residues for reconstructing the current block by adding the reconstructed second-order residues to the prediction set. The motion compensation unit acquires corresponding pixels adjacent to a matching block of a reference video frame for the current block according to the inter mode information. The reconstruction unit combines the first-order residues with the corresponding pixels to generate a reconstructed current block.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
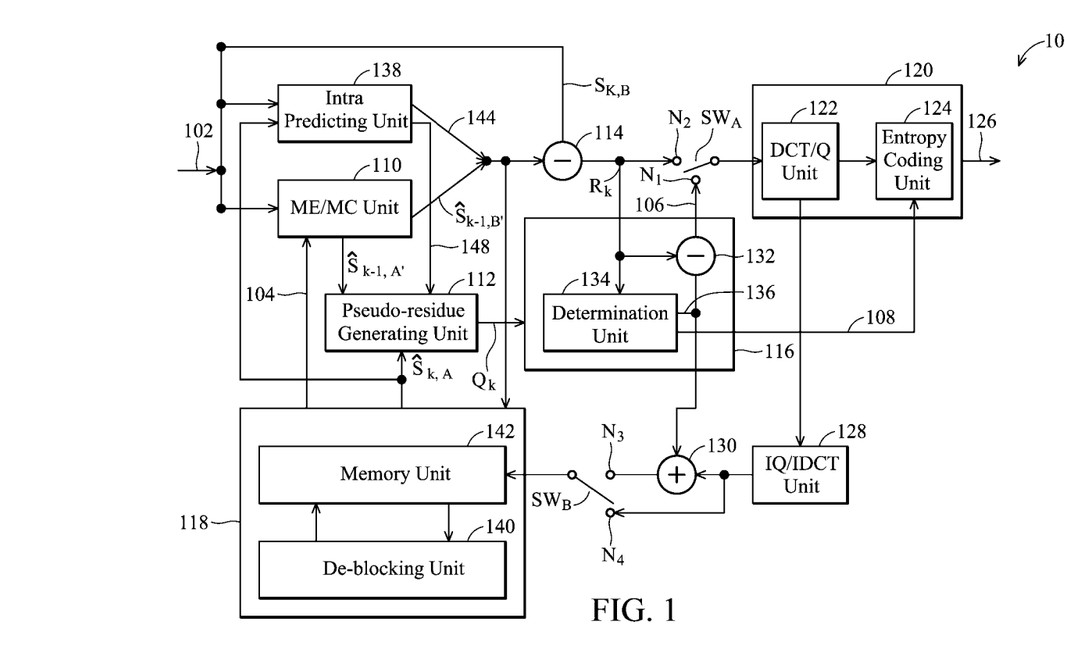
FIG. 1 is a block diagram illustrating a video processing apparatus with residue prediction for video coding according to one embodiment of the invention.

FIG. 1 is a block diagram illustrating a video processing apparatus 10 with residue prediction for video coding according to one embodiment of the invention. The video processing apparatus 10 receives a current video frame 102 spatially partitioned into a plurality of independent blocks. Each partitioned block may be a 16×16 macroblock or sub-partitioned into block sizes of 16×8, 8×16, 8×8, 8×4, 4×8 and 4×4. The video processing apparatus 10 comprises a motion estimation/compensation (ME/MC) unit 110, a pseudo-residue generating unit 112, a first arithmetic unit 114, a residue-predicting unit 116 and a post-processing unit 118. The detailed description of residue prediction for video coding will now be described in the following with reference to FIGS. 2 and 3.

Figure 2:
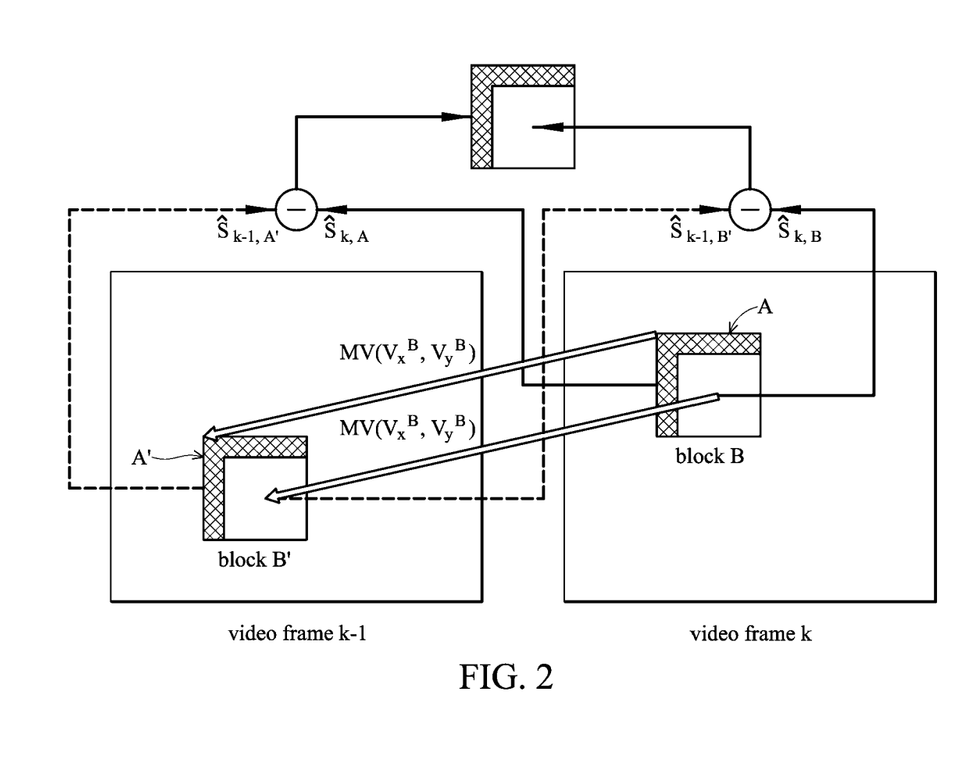
FIG. 2 illustrates an exemplary process for generating pseudo residues for residue prediction in a video processing apparatus according to the invention.

FIG. 2 illustrates an exemplary process for generating pseudo residues for residue prediction in a video processing apparatus according to the invention. As shown in FIG. 2, it is assumed that the video frame k is the current video frame 102 being processed and the video frame k−1 is a previous reference video frame. Note that a future reference video frame may be provided for predicting the video frame k according to another embodiment. After block search, a matching block B' of the video frame k−1 is determined according to a matching method for predicting the current block B of the video frame k. Some matching methods, such as the mean squared error (MSE) matching method may be used to determine the similarity between the current block B and those in the video frame k−1. A motion vector $MV(V_x^B, V_y^B)$ is then calculated to represent a displacement between the current block B and the matching block B'. Thus, first-order residues $R_k$ is obtained by subtracting pixel values within the matching block B' (denoted by $\hat{S}_{k-1,B'}$) from those within the current block B (denoted by $S_{k,B}$). In some embodiments, certain regions of one-pixel width adjacent to the left, the top-left, the top-right, or the top borders of the current block B are defined. According to this embodiment, such regions are referred to as a region set A having neighboring reconstructed pixels. By aligning the neighboring reconstructed pixels with the motion vector $MV(V_x^B, V_y^B)$, corresponding pixels in a region set A' adjacent to the matching block B' are localized. That is, the corresponding pixels in the region set A' are located with motion alignment of the neighboring reconstructed pixels in the region set A. Pseudo residues $Q_k$ are subsequently derived by subtracting pixel values within the region set A' (denoted by $\hat{S}_{k-1,A'}$) from those within the region set A (denoted by $\hat{S}_{k,A}$). It is noted that S indicates the data required to be encoded and $\hat{S}$ indicates the data being reconstructed.

During operation, when residue prediction is activated, the ME/MC unit 110 receives the current video frame 102, e.g., video frame k, and a reference video frame 104, e.g., video frame k−1, to determine the matching block B' of the video frame k−1 according to the current block B of the video frame k. As described above, by motion-aligning with the current block B, the region set A and A' (respectively denoted by $\hat{S}_{k,A}$ and $\hat{S}_{k-1,A'}$) is provided to the pseudo-residue generating unit 112 for generating pseudo residues $Q_k$. The first arithmetic unit 114 then performs inter-frame prediction to acquire the first-order residues $R_k$ by subtracting the matching block B' (denoted by $\hat{S}_{k-1,B'}$) from the current block B (denoted by $S_{k,B}$). Thereafter, the residue-predicting unit 116, coupled to the pseudo-residue generating unit 112, employs the pseudo residues $Q_k$ to predict the first-order residues $R_k$ to derive second-order residues 106 and corresponding residue prediction information 108 for the current block B.

Figure 3:
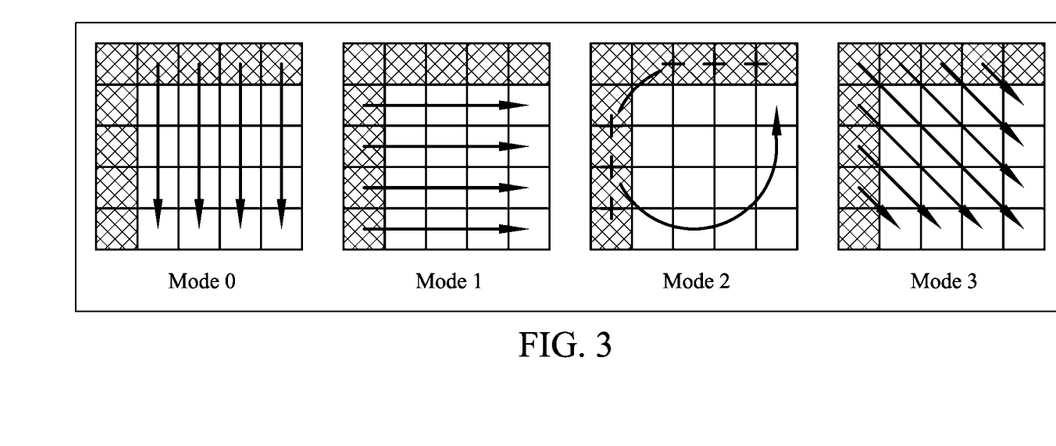
FIG. 3 illustrates four prediction modes for residue prediction in accordance with one embodiment of the invention.

More specifically, the residue-predicting unit 116 comprises a determination unit 134 and a second arithmetic unit 132. The determination unit 134 determines a prediction set 136 in response to the pseudo residues $Q_k$ for the first-order residues $R_k$. Some prediction modes may be employed to predict the first-order residues $R_k$. FIG. 3 illustrates four prediction modes, such as Mode 0, Mode 1, Mode 2 and Mode 3, for residue prediction in accordance with one embodiment of the invention. As shown in FIG. 3, the prediction direction corresponding to each mode is a vertical prediction (Mode 0), a horizontal prediction (Mode 1), a DC prediction (Mode 2) and a diagonal prediction (Mode 3). According to another embodiment, not using directional residue prediction may also be treated as a special mode. The determination unit 134 may select one prediction mode to generate the prediction set 136 with respect to the pseudo residues $Q_k$. The second arithmetic unit 132 is coupled to the determination unit 134 for providing the second-order residues 106 according to the prediction set 136 and the first-order residues $R_k$. According to the embodiment of FIG. 1, the second-order residues 106 are calculated by performing the difference between the first-order residues $R_k$ for the current block and the prediction set 136. In detail, the second arithmetic unit 132 simply subtracts the prediction set 136 from the first-order residues $R_k$ to generate the second-order residues 106. In other embodiments, the second-order residues 106 may be adjusted by further processing steps including, but not limited to, offset processing, weighting and filtering.

Note that the determination unit 134 may jointly optimize all candidate motion vectors for the current block B and entire prediction modes for determining the second-order residues 106 and the corresponding residue prediction information 108 for the current block B. For example, the optimal prediction set is the one that minimizes the energy of the second-order residues 106 in a joint optimization process.

Referring to FIG. 1, a switch $SW_A$ is set to an input contact $N_1$, thereby causing the second-order residues 106 to be inputted to a further encoding unit 120. When no residue prediction is expected, the switch $SW_A$ is set to an input contact $N_2$ which causes the first-order residues $R_k$ to be directly encoded.

According to one embodiment, the encoding unit 120 comprises a discrete cosine transform and quantization (DCT/Q) unit 122 and an entropy coding unit 124. The DCT/Q unit 122 transforms and quantizes the first-order residues $R_k$ or the second-order residues 106 for the current video frame 102 and yields quantized DCT values with respect to the current video frame 102. The entropy coding unit 124 applies entropy coding, such as a variation of run length coding, to the quantized DCT values and the corresponding residue prediction information 108 to generate an output bit-stream 126. In addition, some information regarding inter-frame prediction for the first-order residues $R_k$ (not shown) is also entropy coded via the entropy coding unit 124. The bit-stream 126 may be stored, further processed or provided to a decoding unit. The decoding unit employs the information in the bit-stream 126 to reconstruct the original video frames. The decoding process of the decoding unit is described below in detail with reference to FIG. 4.

When no residue prediction is used, another switch $SW_B$ is set to an input contact $N_4$ to transmit a reconstructed current block generated from an inverse quantization and DCT (IQ/IDCT) unit 128 to the post-processing unit 118. Alternatively, when residue prediction is applied, the IQ/IDCT unit 128 outputs a reconstructed second-order residues to a third arithmetic unit 130. The third arithmetic unit 130 then generates a reconstructed current block according to the reconstructed second-order residues and the prediction set 136. And, the switch $SW_B$ is set to an input contact $N_3$ which causes the reconstructed current block from the third arithmetic unit 130 to be inputted to the post-processing unit 118.

Furthermore, as shown in FIG. 1, the post-processing unit 118 comprises a de-blocking unit 140 and a memory unit 142. The de-blocking unit 140 alleviates the discontinuity artifacts around the boundaries of the reconstructed current block and generates a reconstructed current video frame when all blocks of the current video frame 102 are processed. The memory unit 142 is coupled to the de-blocking unit for storing the reconstructed current block and the reconstructed current video frame respectively provided for encoding subsequent blocks within the current video frame 102 and a next incoming video frame. The reconstructed current video frame may also be outputted to a video display unit (not shown) for display.

In accordance with one embodiment of the invention, the video processing apparatus 10 further comprises an intra predicting unit 138 capable of performing directional residue prediction on residual data for intra-frame prediction of the current block. The intra predicting unit 138 acquires the neighboring reconstructed pixels adjacent to the current block within the current video frame 102. The intra predicting unit 138 then performs intra-frame prediction on the current block to generate a pattern block 144 according to the neighboring reconstructed pixels. The intra predicting unit 138 also defines corresponding pixels 148 adjacent to the neighboring reconstructed pixels for generation of pseudo residues. Similarly, the first arithmetic unit 114 accordingly generates the first-order residues $R_k$ by subtracting the pattern block 144 from the current block $S_{k,B}$, as shown in FIG. 1. Afterwards, the pseudo-residue generating unit 112 constructs another set of pseudo residues $Q_k$ according to the neighboring reconstructed pixels and the corresponding pixels 148 in the current video frame 102. Consequently, the residue-predicting unit 116 predicts the first-order residues $R_k$ according to the another set of pseudo residues $Q_k$ and derives the second-order residues 106 and the corresponding residue prediction information 108 for the current block.

It is further noted that the corresponding residue prediction information 108 comprises prediction parameters respectively from the ME/MC unit 110 and the intra predicting unit 138, block size information of each partitioned block, and mode information indicating a prediction direction of each partitioned block.

Figure 4:
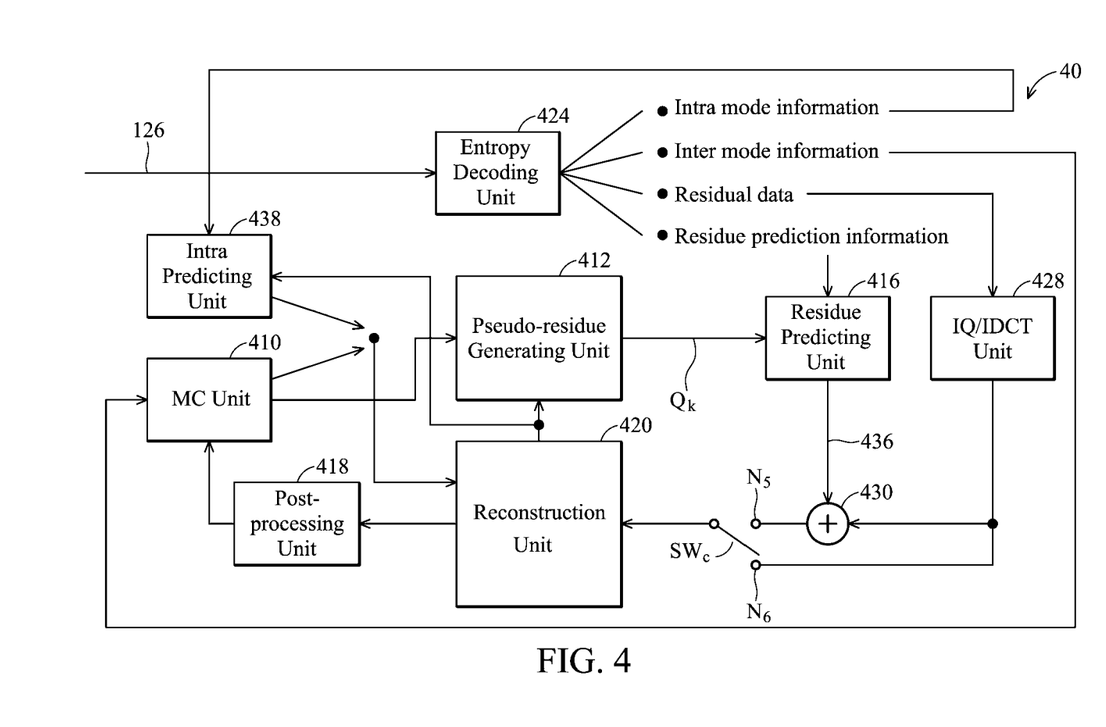
FIG. 4 is a block diagram of a decoding unit according to one embodiment of the invention.

FIG. 4 is a block diagram of an exemplary decoding unit 40. The decoding unit 40 performs a reverse process for video coding with residue prediction and comprises an entropy decoding unit 424, an inverse quantization and DCT (IQ/IDCT) unit 428, a residue predicting unit 416, an intra predicting unit 438, a motion compensation (MC) unit 410, a reconstruction unit 420 and a post-processing unit 418.

In the decoding process, the bit-stream 126 is inputted to the entropy decoding unit 424. The incoming bit-stream 126, as encoded by the entropy coding unit 124 in FIG. 1, specifies the information of each video frame and thus, determines whether inter-frame or intra-frame prediction is to be applied. Specifically, the entropy decoding unit 424 decodes the bit-stream 126 to generate intra mode information for intra-frame prediction, inter mode information for inter-frame prediction, residue prediction information for residue predication and corresponding residual data. When no residual prediction is applied, the IQ/IDCT unit 428 receives the residual data and outputs a reconstructed block to a switch $SW_C$, which is set to an input contact $N_6$. The reconstructed block is subsequently inputted to the reconstruction unit 420. Further, when the output bit-stream 126 is encoded with residual prediction, the IQ/IDCT unit 428 generates a reconstructed second-order residues to a fourth arithmetic unit 430. The residue predicting unit 416 derives a prediction set 436 according to the residue prediction information and pseudo residues $Q_k$ from the pseudo-residue generating unit 412. Operations of generating the pseudo residues $Q_k$ with respect to the intra predicting unit 438 and the MC unit 410 and deriving the prediction set 436 are stated in the aforementioned embodiments of FIGS. 1 and 2, and hence, further description thereof is omitted for brevity. Next, the fourth arithmetic unit 430 outputs first-order residues by adding the reconstructed second-order residues to the prediction set 436. The switch $SW_C$ is set to an input contact $N_5$ which causes the first-order residues from the fourth arithmetic unit 430 to be inputted to the reconstruction unit 420. According to an embodiment, when inter-frame prediction is applied, the MC unit 410 acquires corresponding pixels adjacent to a matching block of a reference video frame for the current block according to the inter mode information. Thus, the reconstruction unit 420 combines the first-order residues with the corresponding pixels to generate a reconstructed current block. Consequently, the post-processing unit 418 stores and performs post-processing to the reconstructed current block output from the reconstruction unit 420.

Figure 5:
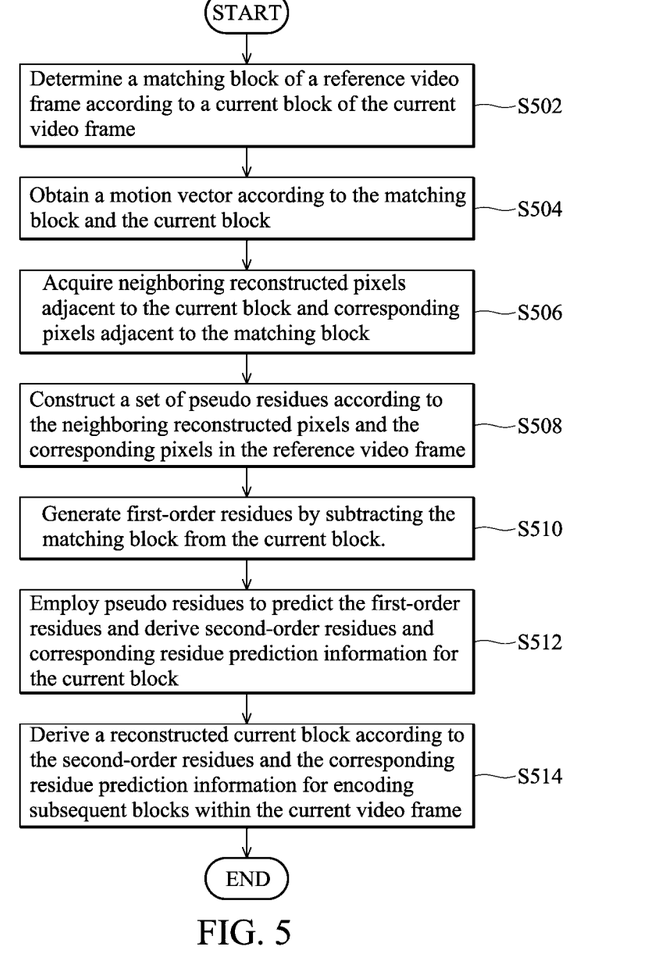
FIG. 5 is a flowchart illustrating a video processing method with residue prediction according to one embodiment of the invention.

FIG. 5 is a flowchart illustrating a video processing method with residue prediction according to one embodiment of the invention. As mentioned above, the video processing method is provided for residue prediction of a current video frame with motion alignment. The current video frame is spatially partitioned into a plurality of independent blocks.

Referring to FIG. 5, a matching block of a reference video frame is determined according to a current block of the current video frame (step S502). From the aforementioned embodiment, the matching block B' in FIG. 2 is searched and selected to most closely match the current block B of the current video frame k. Then, a motion vector describing the location of the matching block B' relative to the current block B is obtained (step S504), as represented in FIG. 2 by the arrow $MV(V_x^B, V_y^B)$.

After some neighboring reconstructed pixels adjacent to the current block are acquired, corresponding pixels adjacent to the matching block is subsequently retrieved by aligning the neighboring reconstructed pixels with the motion vector (step S506). In accordance with the neighboring reconstructed pixels in the current video frame and the corresponding motion-aligned pixels in the reference video frame, a set of pseudo residues is constructed (step S508). A subtraction operation is carried out for the matching block and the current block to generate first-order residues (step S510). Thus, the set of pseudo residues is employed to make residue prediction of the first-order residues, thereby deriving second-order residues and corresponding residue prediction information for the current block (step S512). As a result, a reconstructed current block is generated in accordance with the second-order residues and the corresponding residue prediction information for encoding subsequent blocks within the current video frame (step S514). After all blocks of the current video frame are completely processed, a reconstructed current video frame is accordingly determined for transmission, storage or display.

The invention provides significant improvement over prior art by introducing directional residue prediction to video frame coded with inter-frame prediction or intra-frame prediction, and therefore, a considerable bit-rate saving from attenuating the energy of residual data after inter-frame prediction or intra-frame prediction is achieved without sacrificing video quality for coding.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

The invention claimed is:

1. A video processing apparatus with residue prediction of a current video frame spatially partitioned into a plurality of blocks, comprising:
   a motion estimation/compensation unit for determining a matching block of a reference video frame according to a current block of the current video frame, acquiring neighboring reconstructed pixels adjacent to the current block, and retrieving corresponding pixels adjacent to the matching block by aligning the neighboring reconstructed pixels with a motion vector of the current block, wherein the motion vector represents a displacement between the current block and the matching block;
   a pseudo-residue generating unit for constructing a set of pseudo residues according to the neighboring reconstructed pixels in the current video frame and the corresponding pixels in the reference video frame;
   a first arithmetic unit for generating first-order residues by subtracting the matching block from the current block;
   a residue-predicting unit coupled to the pseudo-residue generating unit for employing the set of pseudo residues to predict the first-order residues and derive second-order residues and corresponding residue prediction information for the current block; and
   a post-processing unit coupled to the residue-predicting unit for deriving a reconstructed current block according to the second-order residues and the corresponding residue prediction information for encoding subsequent blocks within the current video frame.

2. The video processing apparatus as claimed in claim 1, wherein the post-processing unit comprises:
   a de-blocking unit for de-blocking the current video frame; and
   a memory unit coupled to the de-blocking unit for storing the reconstructed current block and a reconstructed current video frame respectively provided for encoding subsequent blocks within the current video frame and a next incoming video frame.

3. The video processing apparatus as claimed in claim 1, wherein the residue-predicting unit comprises:
   a determination unit for determining a prediction set in response to the set of pseudo residues for the first-order residues; and
   a second arithmetic unit coupled to the determination unit for providing the second-order residues according to the prediction set and the first-order residues.

4. The video processing apparatus as claimed in claim 3, wherein the prediction set is subtracted from the first-order residues to generate the second-order residues.

5. The video processing apparatus as claimed in claim 1, wherein the corresponding residue prediction information comprises prediction parameters from the motion estimation/compensation unit, block size information of each partitioned block, and mode information indicating a prediction direction of each partitioned block.

6. The video processing apparatus as claimed in claim 5, wherein the prediction direction includes but not limited to a vertical prediction, a horizontal prediction, a DC prediction and a diagonal prediction.

7. The video processing apparatus as claimed in claim 1, wherein the neighboring reconstructed pixels defines at least one region with one-pixel width, adjacent to the left, the top-left, the top-right, or the top borders of the current block.

8. The video processing apparatus as claimed in claim 5, wherein all candidate motion vectors in a motion estimation process for the current block and the prediction direction are jointly optimized for determining the second-order residues and corresponding residue prediction information for the current block.

9. The video processing apparatus as claimed in claim 1, further comprising an encoding unit for generating an output bit-stream according to the second-order residues and the corresponding residue prediction information.

10. A video processing apparatus with residue prediction of a current video frame spatially partitioned into a plurality of blocks, comprising:
    an intra predicting unit for acquiring neighboring reconstructed pixels adjacent to a current block within the current video frame, performing intra-frame prediction on the current block to generate a pattern block according to the neighboring reconstructed pixels, and defining corresponding pixels adjacent to the neighboring reconstructed pixels;

a first arithmetic unit for generating first-order residues by subtracting the pattern block from the current block;

a pseudo-residue generating unit for constructing a set of pseudo residues according to the neighboring reconstructed pixels and the corresponding pixels in the current video frame;

a residue-predicting unit coupled to the pseudo-residue generating unit for predicting the first-order residues according to the set of pseudo residues and deriving second-order residues and corresponding residue prediction information for the current block; and a post-processing unit coupled to the residue-predicting unit for deriving a reconstructed current block according to the second-order residues and the corresponding residue prediction information for encoding subsequent blocks within the current video frame.

11. A video processing method with residue prediction of a current video frame spatially partitioned into a plurality of blocks, comprising:

determining a matching block of a reference video frame according to a current block of the current video frame;

acquiring neighboring reconstructed pixels adjacent to the current block;

retrieving corresponding pixels adjacent to the matching block by aligning the neighboring reconstructed pixels with a motion vector of the current block, wherein the motion vector represents a displacement between the current block and the matching block;

constructing a set of pseudo residues according to the neighboring reconstructed pixels in the current video frame and the corresponding pixels in the reference video frame;

generating first-order residues by subtracting the matching block from the current block;

employing the set of pseudo residues to predict the first-order residues;

deriving second-order residues and corresponding residue prediction information for the current block; and deriving a reconstructed current block according to the second-order residues and the corresponding residue prediction information for encoding subsequent blocks within the current video frame.

12. The video processing method as claimed in claim 11, further comprising:

generating a reconstructed current video frame when all blocks of the current video frame are processed; and storing the reconstructed current block and the reconstructed current video frame respectively for encoding subsequent blocks within the current video frame and a next incoming video frame.

13. The video processing method as claimed in claim 11, wherein the step of employing the set of pseudo residues comprises:

determining a prediction set in response to the set of pseudo residues for the first-order residues; and providing the second-order residues according to the prediction set and the first-order residues.

14. The video processing method as claimed in claim 13, wherein the prediction set is subtracted from the first-order residues to generate the second-order residues.

15. The video processing method as claimed in claim 11, wherein the corresponding residue prediction information comprises prediction parameters for each partitioned block, block size information of each partitioned block, and mode information indicating a prediction direction of each partitioned block.

16. The video processing method as claimed in claim 15, wherein the prediction direction comprises a vertical prediction, a horizontal prediction, a DC prediction and a diagonal prediction.

17. The video processing method as claimed in claim 11, wherein the neighboring reconstructed pixels defines at least one region with one-pixel width, adjacent to the left, the top-left, the top-right, or the top borders of the current block.

18. The video processing method as claimed in claim 15, wherein all candidate motion vectors in a motion estimation process for the current block and the prediction direction are jointly optimized for determining the second-order residues and the corresponding residue prediction information for the current block.

19. The video processing method as claimed in claim 11, further comprising:

generating an output bit-stream according to the second-order residues and the corresponding residue prediction information.

20. A video processing method with residue prediction of a current video frame spatially partitioned into a plurality of blocks, comprising:

acquiring neighboring reconstructed pixels adjacent to a current block within the current video frame;

performing intra-frame prediction on the current block to generate a pattern block according to the neighboring reconstructed pixels;

defining corresponding pixels adjacent to the neighboring reconstructed pixels;

generating first-order residues by subtracting the pattern block from the current block;

constructing a set of pseudo residues according to the neighboring reconstructed pixels and the corresponding pixels in the current video frame;

employing the set of pseudo residues to predict the first-order residues;

deriving second-order residues and corresponding residue prediction information for the current block; and deriving a reconstructed current block according to the second-order residues and the corresponding residue prediction information for encoding subsequent blocks within the current video frame.

21. A video decoder with residue prediction for decoding a bit-stream into video frames partitioned into a plurality of blocks, comprising:

a decoding unit, receiving and decoding the bit-stream, generating inter mode information, residue prediction information and corresponding residual data;

an inverse quantization and discrete cosine transform (IQ/IDCT) unit, generating a reconstructed second-order residues from the residual data for reconstructing a current block of a current video frame from the residual data;

a pseudo-residue generating unit, generating pseudo residues for reconstructing the current block;

a residue predicting unit, deriving a prediction set of the current block according to the residue prediction information from the decoding unit and the pseudo residues from the pseudo-residue generating unit;

an arithmetic unit, outputting first-order residues for reconstructing the current block by adding the reconstructed second-order residues to the prediction set;

a motion compensation unit, acquiring corresponding pixels adjacent to a matching block of a reference video frame for the current block according to the inter mode information; and a reconstruction unit, combining the first-order residues with the corresponding pixels to generate a reconstructed current block.

22. The video decoder as claimed in claim 21, wherein the pseudo-residue generating unit generates the pseudo residues according to neighboring reconstructed pixels adjacent to the current block in the current video frame and the corresponding pixels in the reference video frame.

23. The video decoder as claimed in claim 22, wherein the neighboring reconstructed pixels defines at least one region with one-pixel width, adjacent to the left, the top-left, the top-right, or the top borders of the current block.

24. The video decoder as claimed in claim 21, further comprising:

a post-processing unit, storing and performing post-processing to the reconstructed current block output from the reconstruction unit.

25. The video decoder as claimed in claim 21, wherein the residue prediction information indicates whether the residue prediction is performed on each partitioned block and a prediction direction of each partitioned block.

26. A video decoder with residue prediction for decoding a bit-stream into video frames partitioned into a plurality of blocks, comprising:

a decoding unit, receiving and decoding the bit-stream, generating intra mode information, residue prediction information and corresponding residual data;

an inverse quantization and discrete cosine transform (IQ/IDCT) unit, generating a reconstructed second-order residues from the residual data for reconstructing a current block of a current video frame from the residual data;

a pseudo-residue generating unit, generating pseudo residues for reconstructing the current block;

a residue predicting unit, deriving a prediction set of the current block according to the residue prediction information from the decoding unit and the pseudo residues from the pseudo-residue generating unit;

an arithmetic unit, outputting first-order residues for reconstructing the current block by adding the reconstructed second-order residues to the prediction set of the current block;

an intra predicting unit, acquiring neighboring reconstructed pixels adjacent to the current block within the current video frame according to intra mode information from the decoding unit and defining corresponding pixels adjacent to the neighboring reconstructed pixels; and a reconstruction unit, combining the first-order residues with the corresponding pixels to generate a reconstructed current block.

27. The video decoder as claimed in claim 25, wherein the prediction direction includes but not limited to a vertical prediction, a horizontal prediction, a DC prediction and a diagonal prediction.

\* \* \* \* \*